US008321835B2

(12) United States Patent
Mitchell

(10) Patent No.: US 8,321,835 B2
(45) Date of Patent: Nov. 27, 2012

(54) SYSTEM DECOMPOSITION VIA EVOLUTIONARY PROGRAMMING

(75) Inventor: Steven W. Mitchell, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 875 days.

(21) Appl. No.: 12/436,714

(22) Filed: May 6, 2009

(65) Prior Publication Data

US 2010/0287527 A1    Nov. 11, 2010

(51) Int. Cl.
*G06F 9/44* (2006.01)
*G06F 17/30* (2006.01)
(52) U.S. Cl. ......... 717/108; 717/105; 717/106; 717/107
(58) Field of Classification Search .................. None
See application file for complete search history.

(56) References Cited

U.S. PATENT DOCUMENTS

| 6,442,748 | B1 * | 8/2002 | Bowman-Amuah | 717/108 |
| 7,533,365 | B1 * | 5/2009 | Hogstrom et al. | 717/105 |
| 7,546,577 | B2 * | 6/2009 | Do et al. | 717/108 |

OTHER PUBLICATIONS

I. C. Parmee, "Evolutionary and Adaptive Strategies for Efficient Search Across Whole System Engineering Design Hierarchies", "Artificial Intelligence for Engineering Design, Analysis and Manufacturing (1998)", 1998, pp. 431-445, Publisher: Cambridge University Press, Published in: US.

Zaidi et al., "A Genetic Algorithm Based Tool for Generating Organizational Architectures", "IEEE International Conference on Systems, Man, and Cybernetics 1998", Oct. 11-14, 1998, pp. 24952500, vol. 3, Publisher: IEEE, Published in: US.

Parmee et al., "Multiobjective Satisfaction within an Interactive Evolutionary Design Environment", "Evolutionary Computation 8(2)", 2000, pp. 197-222, Publisher: Massachusetts Institute of Technology, Published in: US.

Seng et al., "Search-based Improvement of Subsystem Decompositions", "Genetic and Evolutionary Computation Conference 2005", 2005, pp. 1045-1051, Published in: US.

* cited by examiner

*Primary Examiner* — Isaac Tecklu
*Assistant Examiner* — Mohammad Kabir
(74) *Attorney, Agent, or Firm* — Kaplan Breyer Schwarz & Ottesen, LLP

(57) ABSTRACT

A technique for generating good system decompositions is disclosed. The illustrative embodiment uses evolutionary programming in combination with a fitness function to generate a system decomposition that has a low degree of coupling and a high degree of coherence. A system is represented by an object-oriented specification using the Unified Modeling Language (UML); the UML specification is then represented by an eXtended Markup Language (XML) document, and the contents of the document are transformed into a nested-list data structure that resembles source code in a functional programming language such as Common LISP. The nested-list data structure and an appropriate fitness function are input to an evolutionary programming engine that operates on the nested-list data structure as though it were a source code program, and generates an output source code program. A system decomposition is then derived from the output source code program.

15 Claims, 6 Drawing Sheets

Figure 5

```
(system
  (dependencies ())
  (associations (A E) (A G) (C G) (C F) (D B) (D G))
  (generalizations ())
  (subsystems (B D) (F C) (E A G))
  ...
))
```

SYSTEM DECOMPOSITION VIA EVOLUTIONARY PROGRAMMING

FIELD OF THE INVENTION

The present invention relates to optimization in general, and, more particularly, to optimal system-subsystem decomposition.

BACKGROUND OF THE INVENTION

In some instances it is useful to decompose the elements of a system into a plurality of subsystems. Such decomposition can facilitate understanding of the system, implementation of the system (particularly when performed by a team of individuals), and visual presentation via a computer monitor or printed paper.

FIG. 1 depicts first illustrative decomposition 100 of a system, in accordance with the prior art. As shown in FIG. 1, the system comprises six elements 101-1 through 101-6, interconnected as shown, and decomposition 100 comprises three subsystems: subsystem 102-1, comprising elements 101-1, 101-3, and 101-4; subsystem 102-2, comprising elements 101-5 and 101-7; and subsystem 102-3, comprising elements 101-2 and 101-6.

FIG. 2 depicts second illustrative decomposition 200 of the same system, in accordance with the prior art. As shown in FIG. 2, decomposition 200 also comprises three subsystems: subsystem 202-1, comprising elements 101-6 and 101-3; subsystem 202-2, comprising elements 101-5, 101-1, and 101-7; and subsystem 202-3, comprising elements 101-2 and 101-4.

Intuitively, second decomposition 200 might be considered "better" than first decomposition 100 because it has fewer connections between subsystems. In this regard, second decomposition 200 is said to have a lower degree of coupling than first decomposition 100.

Similarly, second decomposition 200 could be considered better than first decomposition 100 because in second decomposition 200, there are more connections among elements within each particular subsystem. In this regard, second decomposition 200 is said to have a higher degree of coherence than first decomposition 100.

The problem of finding a system decomposition that is optimal in coupling and coherence belongs to a class of problems known as NP-hard. Such problems have no known polynomial-time solutions and are considered intractable for anything other than small problem sizes (i.e., in the case of system decomposition, systems with a small number of elements). Therefore for larger problem sizes the best that one can hope for is a heuristic technique for finding, in a reasonable amount of time, a system decomposition that is good, albeit not necessarily optimal. Moreover, for typical large system design problems there are often additional system-subsystem decomposition criteria that must be considered beyond coherence and coupling. Adding these additional criteria significantly increases the complexity of determining the quality of candidate decompositions.

SUMMARY OF THE INVENTION

The present invention provides a heuristic technique for generating good system decompositions. In particular, the illustrative embodiment uses evolutionary programming in combination with a fitness function to generate a system decomposition that has a low degree of coupling and a high degree of coherence. Evolutionary programming is a technique in which reproductive operators are applied to modify the structure of computer programs or similar data structures in a collection or population of such objects to create derivative computer programs. The members of the population are then evaluated against a set of criteria using a fitness function. Applying one of a variety of strategies, a subset of the population is selected to form the next generation of the population, and the process is repeated until the fitness of one or more individuals in the population exceeds a specified fitness threshold.

In evolutionary programming, reproduction can be asexual or sexual—i.e., it can involve one or more members of the population. Reproductive operators can include but are not limited to crossover and mutation. In the context of reproducing a computer program which is represented as a graph, asexual crossover can be implemented by copying the parent graph, removing a node or group of nodes and the associated connecting arcs from one part of the child graph and reconnecting that node or group of nodes and the associated connecting arcs at another place in the child graph. A mutation operator applied to a child graph might duplicate a node or group of nodes and the associated connecting arcs and attach that node or group of nodes and the associated connecting arcs at another place in the child graph. Once the reproductive operators have been applied to a population and the fitness of individual members of the population has been assessed, strategies that could be applied to select the members of the next generation could include but not be limited to random selection, or selection of the most fit individuals in the population.

In accordance with the illustrative embodiment, a system is represented by an object-oriented specification using the Unified Modeling Language (UML). The UML specification is then represented by an eXtended Markup Language (XML) document, and the contents of the document are transformed into a nested-list data structure that resembles source code in a functional programming language such as Common LISP. The nested-list data structure and an appropriate fitness function are then input to an evolutionary programming engine. The evolutionary programming engine then operates on the nested-list data structure as though it were a source code program, and generates an output source code program that is deemed to be good by the fitness function. The output source code program is then transformed into a new XML document, and a new UML object-oriented specification, and finally a system decomposition is obtained from the UML specification.

The present invention is advantageous in that it can be implemented by interfacing with an already-existing evolutionary programming engine. By representing systems as pseudo-programs, the present invention advantageously harnesses the symbol-processing capabilities of evolutionary programming to generate system decompositions. This contrasts markedly to alternative heuristic techniques such as genetic algorithms that operate on the bits of a binary representation of a system.

The illustrative embodiment comprises: generating an object-oriented specification of a system design; generating a nested-list data structure based on the object-oriented specification; inputting the nested-list data structure as a source code program to an evolutionary programming engine; and generating a decomposition of the system design based on an output source code program of the evolutionary programming engine.

BRIEF DESCRIPTION OF THE DRAWINGS

FIG. 5 depicts an illustrative nested-list data structure, in accordance with the illustrative embodiment of the present invention.

DETAILED DESCRIPTION

Figure 1:
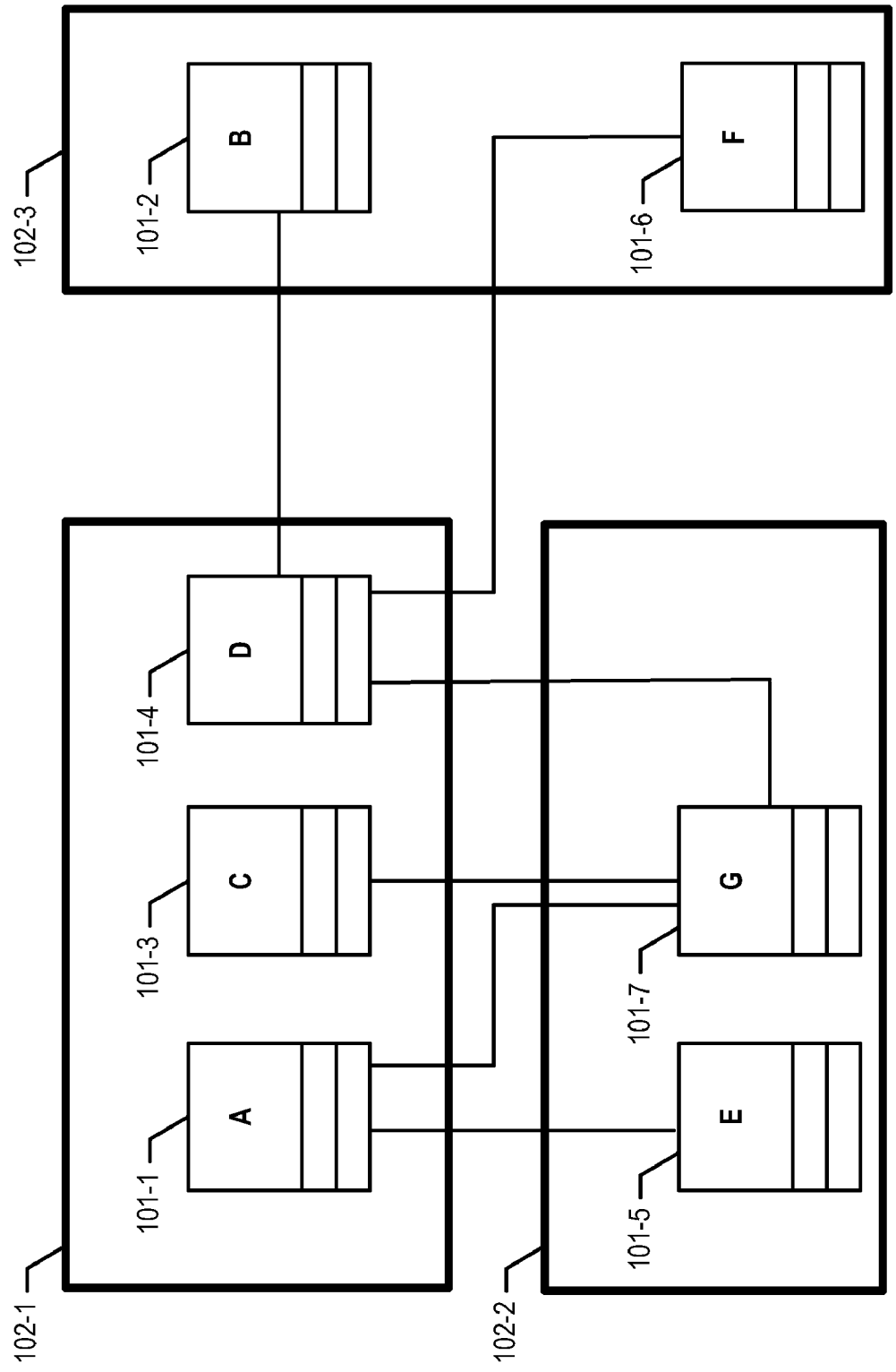
FIG. 1 depicts a first illustrative system decomposition, in accordance with the prior art.
Figure 2:
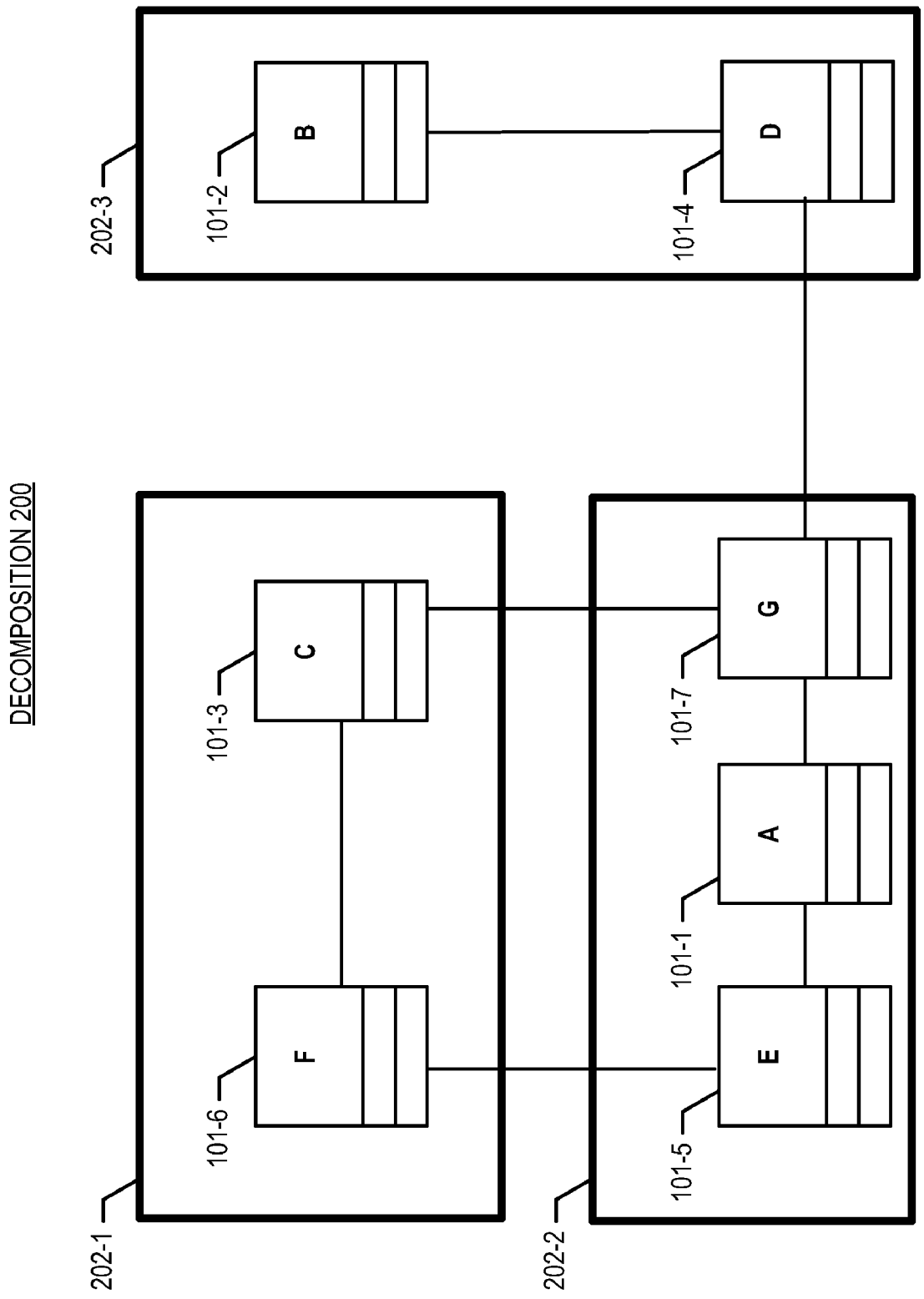
FIG. 2 depicts a second illustrative system decomposition, in accordance with the prior art.
Figure 3:
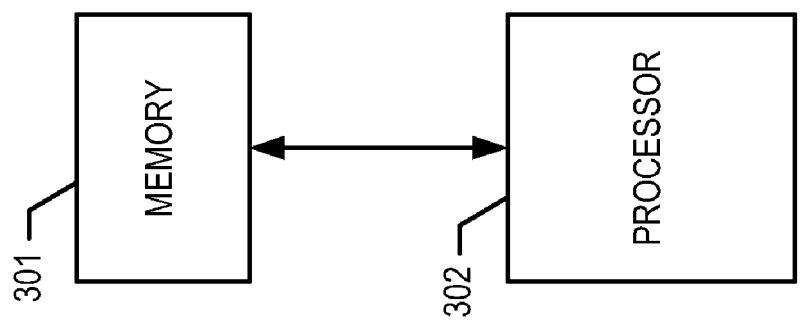
FIG. 3 depicts the salient elements of a data-processing system for generating a decomposition of a system, in accordance with the illustrative embodiment of the present invention.

FIG. 3 depicts the salient elements of data-processing system 300, in accordance with the illustrative embodiment of the present invention. As shown in FIG. 3, data-processing system 300 comprises memory 301 and processor 302, interconnected as shown.

Memory 301 is capable of storing data and executable instructions, as is well-known in the art, and might be any combination of random-access memory (RAM), flash memory, disk drive memory, etc. It will be clear to those skilled in the art, after reading this specification, how to make and use memory 301.

Processor 302 is a general-purpose processor that is capable of executing instructions stored in memory 301, of reading data from and writing data into memory 301, and of executing the tasks of the methods described below and with respect to FIGS. 4 and 6. As will be appreciated by those skilled in the art, in some alternative embodiments of the present invention, processor 302 might instead be a special-purpose processor. In either case, it will be clear to those skilled in the art, after reading this specification, how to make and use processor 302.

Figure 4:
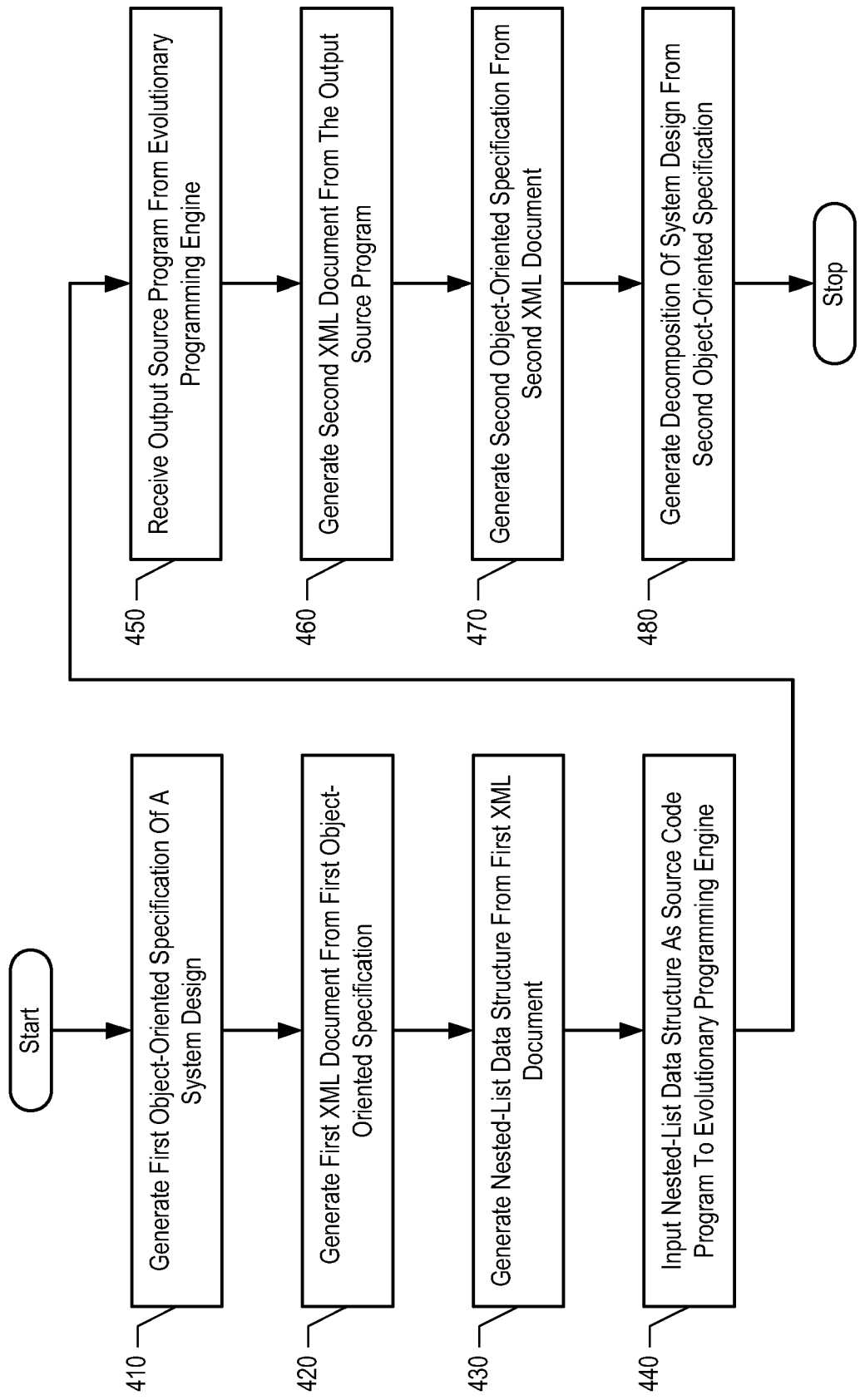
FIG. 4 depicts a flowchart of a method for generating a system decomposition using an evolutionary programming engine, in accordance with the illustrative embodiment of the present invention.

FIG. 4 depicts a flowchart of a method for generating a system decomposition using an evolutionary programming engine, in accordance with the illustrative embodiment of the present invention. It will be clear to those skilled in the art, after reading this specification, which tasks depicted in FIG. 4 can be performed simultaneously or in a different order than that depicted.

At task 410, a first object-oriented specification of a system design is generated. In accordance with the illustrative embodiment, a Unified Modeling Language (UML) specification is generated at task 410. As will be appreciated by those skilled in the art, however, some other embodiments of the present invention might generate an alternative type of object-oriented specification, and it will be clear to those skilled in the art, after reading this specification, how to make and use embodiments that employ such alternative specifications.

At task 420, a first eXtended Markup Language (XML) document is generated from the first object-oriented specification. In accordance with the illustrative embodiment, the XML document comprises a class decomposition in the XML Metadata Interchange (XMI) format; however, as will be appreciated by those skilled in the art, in some other embodiments of the present invention, the XML document might employ some alternative format, and it will be clear to those skilled in the art, after reading this disclosure, how to make and use embodiments that employ such alternative formats.

At task 430, a graph representation of the first eXtended Markup Language document is generated. This graph representation can be implemented as a nested-list data structure, wherein the nested-list data structure has the same structure as source code for a functional programming language (e.g., Common LISP, etc.). An illustrative nested-list data structure is shown in FIG. 5. As will be appreciated by those skilled in the art, in some other embodiments of the present invention, some other type of representation of the extended Markup Language document might be employed (e.g., a tree representation, etc.), and it will be clear to those skilled in the art, after reading this disclosure, how to make and use embodiments that employ such representations.

At task 440, the nested-list data structure generated at task 430 is input as a source code program to an evolutionary programming engine. In addition, an appropriate fitness function is input to the evolutionary programming engine. As will be appreciated by those skilled in the art, in some embodiments the evolutionary programming engine might reside and execute on data-processing system 300 itself, while in some other embodiments, the evolutionary programming engine might reside and execute on some other data-processing system and be invoked remotely (e.g., via a remote procedure call (RPC), via a web service, etc.).

In accordance with the illustrative embodiment, the fitness function combines a first term based on degree of coupling and a second term based on degree of coherence. As will be appreciated by those skilled in the art, in some other embodiments of the present invention the fitness function might employ one or more other measures of the goodness of system decomposition candidates, either in addition to, or instead of, those of the illustrative embodiment, and it will be clear to those skilled in the art, after reading this specification, how to make and use embodiments that employ such alternative fitness functions.

At task 450, an output source program is received from the evolutionary programming engine, in well-known fashion. The tasks performed by the evolutionary programming engine are described in detail below and with respect to FIG. 6.

At task 460, a second eXtended Markup Language document is generated from the output source program. In accordance with the illustrative embodiment, task 460 is performed in the same manner as task 430, but in reverse.

At task 470, a second object-oriented specification is generated from the second eXtended Markup Language document. In accordance with the illustrative embodiment, the second object-oriented specification, like the first object-oriented specification, is represented in the Unified Modeling Language (UML), and task 470 is performed in the same manner as task 420, but in reverse.

At task 480, a decomposition of the system design is generated from the second Unified Modeling Language specification. In accordance with the illustrative embodiment, task 480 is performed in the same manner as task 410, but in reverse.

After task 480 is completed, the method of FIG. 4 terminates. As will be appreciated by those skilled in the art, some other embodiments of the present invention might combine one or more tasks of FIG. 4 into a single task, or might omit one or more tasks of FIG. 4 altogether, and it will be clear to those skilled in the art, after reading this specification, how to make and use such alternative embodiments.

Figure 6:
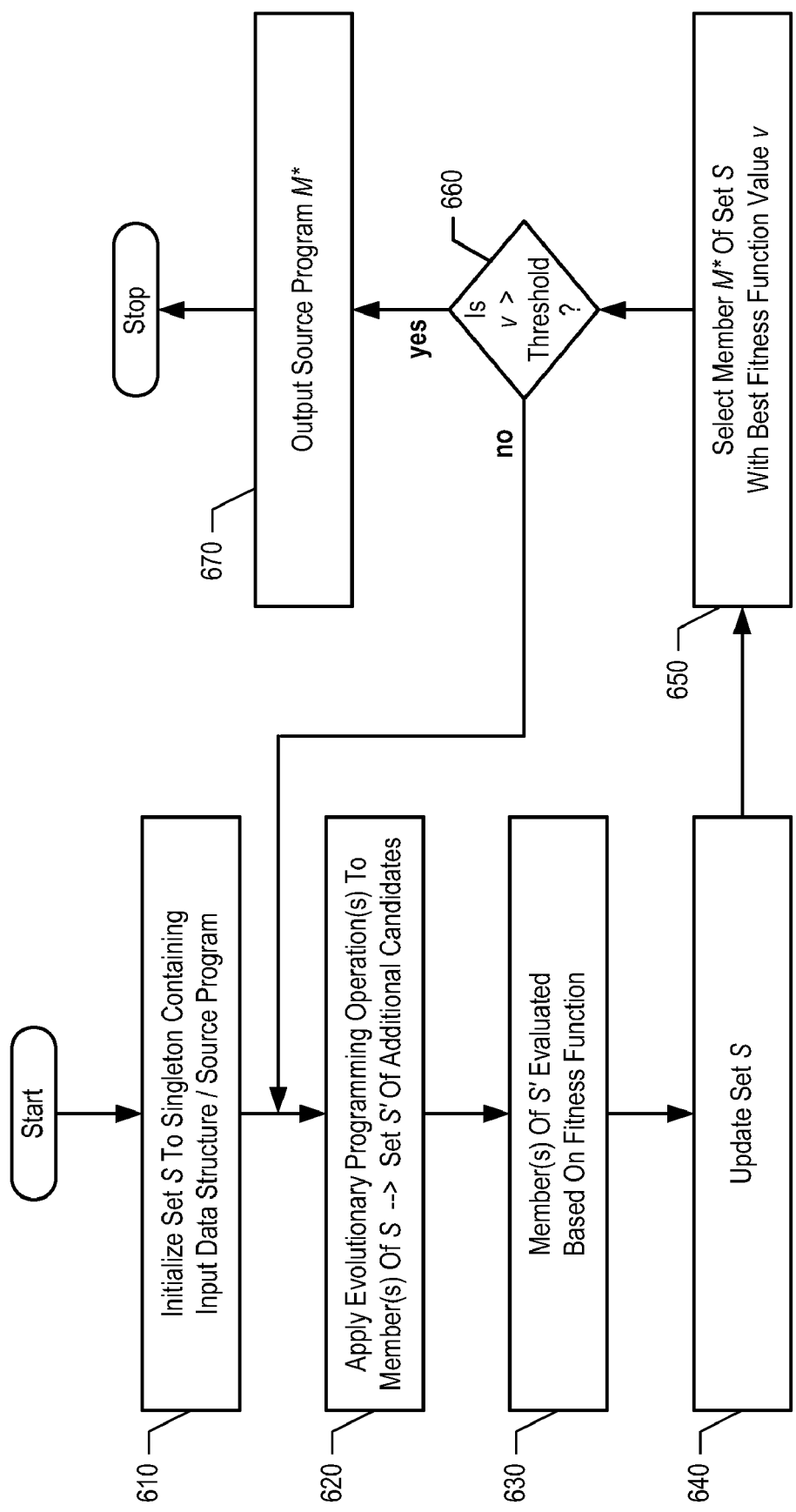
FIG. 6 depicts a flowchart of the salient tasks of an evolutionary programming engine employed in the method of FIG. 4, in accordance with the illustrative embodiment of the present invention.

FIG. 6 depicts a flowchart of the salient tasks of the evolutionary programming engine employed in the method of FIG. 4, in accordance with the illustrative embodiment of the present invention. It will be clear to those skilled in the art, after reading this specification, which tasks depicted in FIG. 6 can be performed simultaneously or in a different order than that depicted.

At task 610, candidate set S is initialized to a singleton containing the input data structure/source program.

At task 620, one or more evolutionary programming operations are applied to one or more members of set S to obtain a set S' of additional candidates.

At task 630, one or more members of set S' are evaluated based on the fitness function.

At task 640, set S is updated. As is well-known in the art, updating set S might comprise removing members of set S, adding members of set S' to set S, or a combination of both, based on the evaluations of the members of set S and set S'.

At task 650, the member M* of set S with the best fitness function value v is selected.

At task 660, the value v of the fitness function for member M* is compared to a threshold. If this value exceeds the threshold, then execution proceeds to task 670, otherwise, execution continues back at task 620.

At task 670, source code program M* is output. After task 670, the method of FIG. 6 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    generating an object-oriented specification of a system design;
    generating a nested-list data structure based on said object-oriented specification, wherein said nested-list data structure has the same structure as source code for a functional programming language;
    inputting said nested-list data structure as a source code program to an evolutionary programming engine that processes said source code using said functional programming language; and
    generating a decomposition of said system design based on an output source code program generated by said evolutionary programming engine, wherein said decomposition is an improvement in at least one of (i) a measure of cohesion, and (ii) a measure of coupling, as compared to another decomposition of said system that is not based on an output from said evolutionary programming engine.

2. The method of claim 1 wherein said functional programming language is a dialect of LISP.

3. The method of claim 1 wherein said object-oriented specification is a Unified Modeling Language specification.

4. The method of claim 1 further comprising inputting a fitness function to said evolutionary programming engine.

5. The method of claim 4 further comprising evaluating said output source code program of said evolutionary programming engine based on said fitness function.

6. The method of claim 5 wherein said fitness function is based on a measure of cohesion of said output source code program.

7. The method of claim 5 wherein said fitness function is based on a measure of coupling in said output source code program.

8. The method of claim 7 wherein said fitness function is also based on a measure of cohesion of said output source code program.

9. A method comprising:
    generating a first Unified Modeling Language specification of a system design;
    generating a first eXtended Markup Language document from said first Unified Modeling Language specification;
    generating from said first eXtended Markup Language document a first nested-list data structure that has the same structure as source code for a functional programming language;
    applying one or more evolutionary programming operations to said first nested-list data structure to obtain a plurality of alternative nested-list data structures;
    evaluating at least one of said plurality of alternative nested-list data structures based on a fitness function that is based on at least one of (i) a measure of cohesion, and (ii) a measure of coupling;
    selecting one of said alternative nested-list data structures based on the evaluation, wherein the selected alternative nested-list data structure is an improvement in at least one of (i) the measure of cohesion, and (ii) the measure of coupling, as compared to the first nested-list data structure;
    generating a second eXtended Markup Language document from the selected alternative nested-list data structure;
    generating a second Unified Modeling Language specification from said second eXtended Markup Language document; and
    generating a decomposition of said system design from said second Unified Modeling Language specification.

10. The method of claim 9 wherein said functional programming language is a dialect of LISP.

11. An apparatus comprising:
    a memory for storing a first system design; and
    a processor for:
        generating an object-oriented specification of a system design;
        generating a nested-list data structure based on said object-oriented specification, wherein said nested-list data structure has the same structure as source code for a functional programming language;
        inputting said nested-list data structure as a source code program to an evolutionary programming engine that processes said source code using said functional programming language; and
        generating a decomposition of said system design based on an output source code program generated by said evolutionary programming engine, wherein said decomposition is an improvement in at least one of (i) a measure of cohesion, and (ii) a measure of coupling, as compared to another decomposition of said system that is not based on an output from said evolutionary programming engine.

12. The apparatus of claim 11 wherein said functional programming language is a dialect of LISP.

13. The apparatus of claim 11 wherein said object-oriented specification is a Unified Modeling Language specification.

14. The apparatus of claim 11 wherein said processor is also for inputting a fitness function to said evolutionary programming engine.

15. The apparatus of claim 14 wherein said processor is also for evaluating said output source code program of said evolutionary programming engine based on said fitness function.

* * * * *